Figure 1:
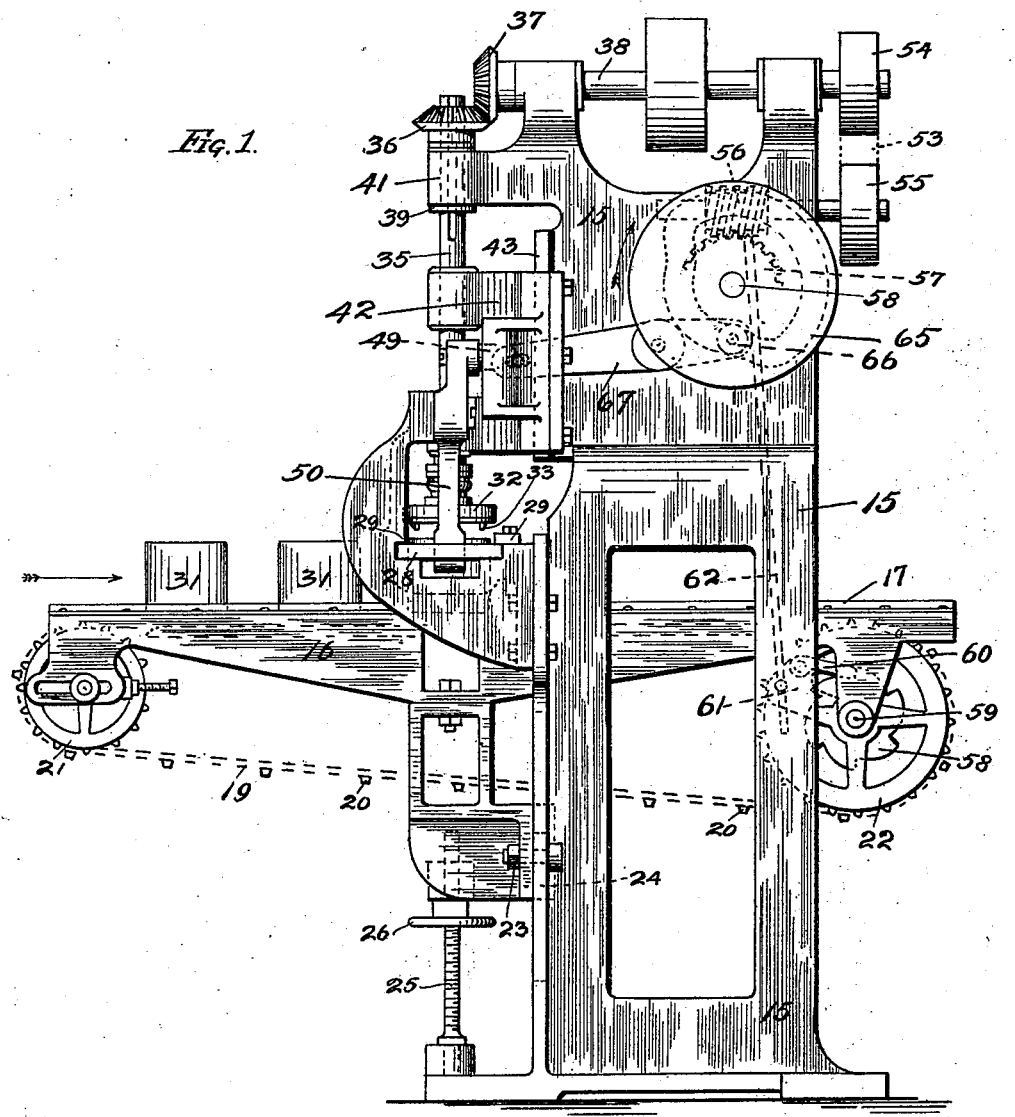

No. 693,017. Patented Feb. 11, 1902.
J. G. HODGSON.
CAN BODY FLANGING MACHINE.
(Application filed June 28, 1901.)
(No Model.) 6 Sheets—Sheet 3.

WITNESSES: INVENTOR.
F. B. Townsend John G. Hodgson
H. W. Munday BY Munday, Evarts & Adcock
ATTORNEYS No. 693,017.  
J. G. HODGSON.  
CAN BODY FLANGING MACHINE.  
(Application filed June 28, 1901.)  
Patented Feb. 11, 1902.

(No Model.)  
6 Sheets—Sheet 4.

WITNESSES:  
F. B. Townsend  
H. W. Munday

INVENTOR.  
John G. Hodgson  
BY  
Munday, Evarts & Adcock  
ATTORNEYS

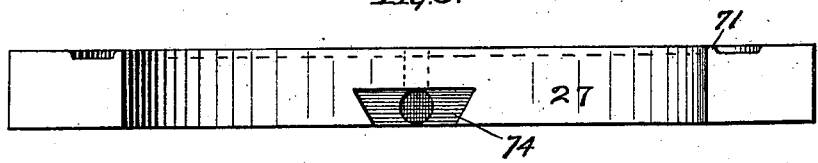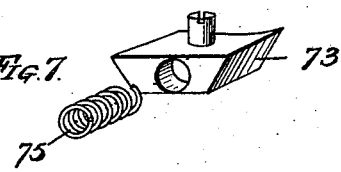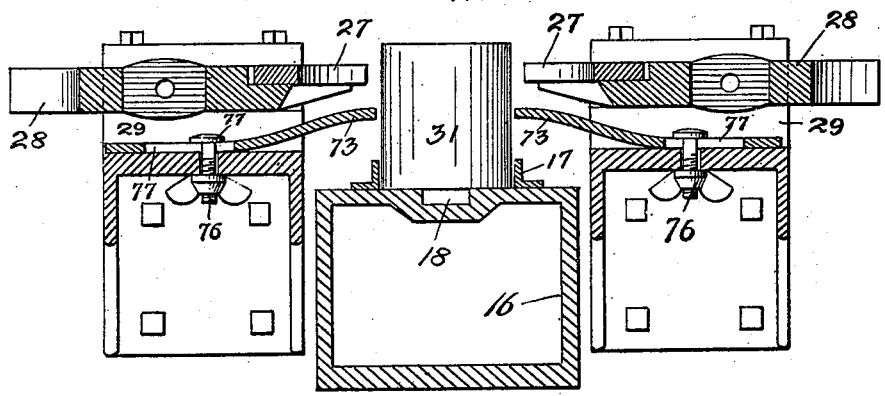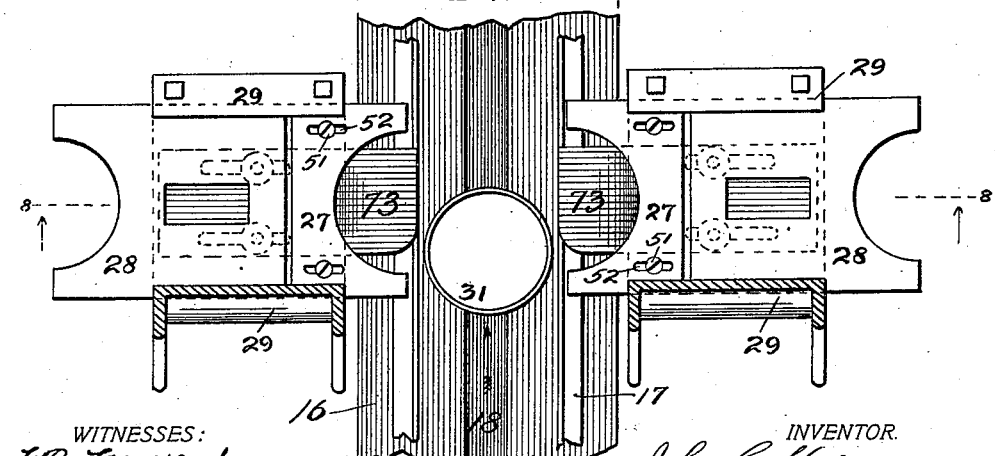

No. 693,017. Patented Feb. 11, 1902.
J. G. HODGSON.
CAN BODY FLANGING MACHINE.
(Application filed June 28, 1901.)
(No Model.) 6 Sheets—Sheet 6.
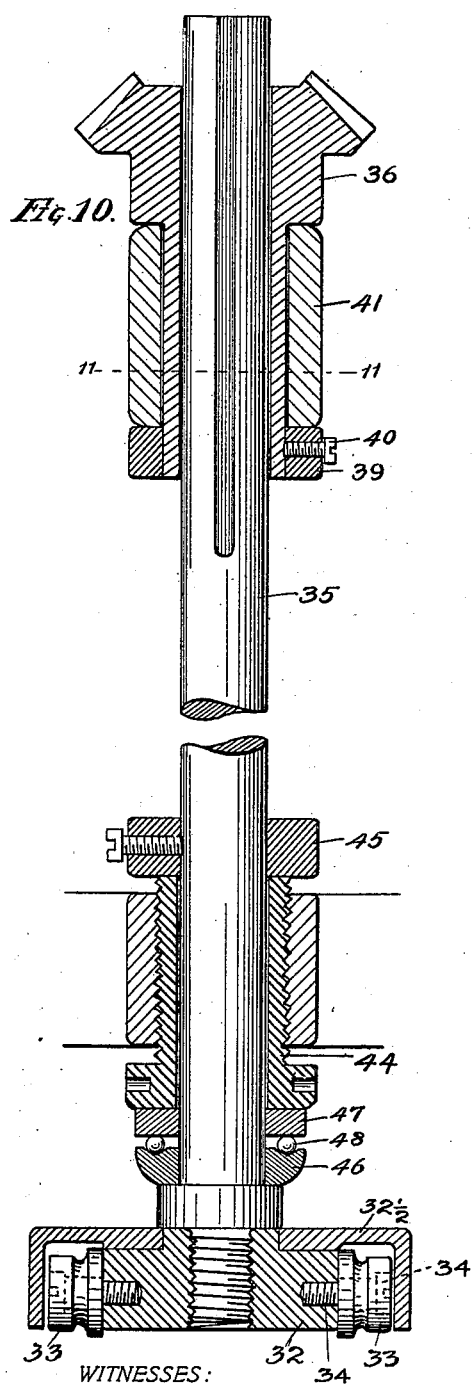
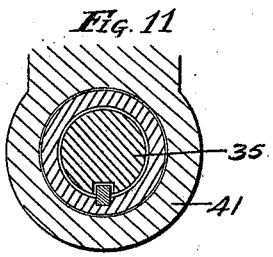
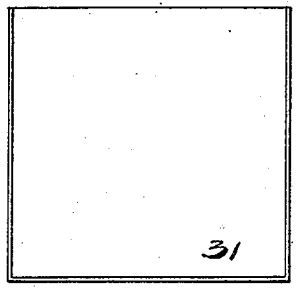
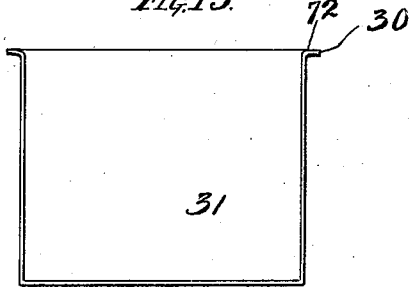
WITNESSES:
J. B. Townsend
N. W. Munday
INVENTOR
John G. Hodgson,
BY
Munday, Evarts & Adcock.
ATTORNEYS

UNITED STATES PATENT OFFICE.

JOHN G. HODGSON, OF MAYWOOD, ILLINOIS, ASSIGNOR TO AUTOMATIC VACUUM CANNING COMPANY, OF CHICAGO, ILLINOIS, A CORPORATION OF ILLINOIS.

CAN-BODY-FLANGING MACHINE.

SPECIFICATION forming part of Letters Patent No. 693,017, dated February 11, 1902.

Application filed June 28, 1901. Serial No. 66,353. (No model.)

*To all whom it may concern:*

Be it known that I, JOHN G. HODGSON, a citizen of the United States, residing in Maywood, in the county of Cook and State of Illinois, have invented a new and useful Improvement in Can-Body-Flanging Machines, of which the following is a specification.

My invention relates to machines for flanging can-bodies.

The object of my invention is to provide a machine of a simple, efficient, and durable construction and by means of which can-bodies may be uniformly and also automatically, rapidly, and cheaply flanged or provided with flanges suitable for double-seaming the covers thereto.

A further object is to so construct the machine that it may be readily adapted for use in flanging can-bodies of different heights or dimensions.

My invention consists in the means I employ to practically accomplish this object or result—that is to say, it consists in the combination, with a feed-table upon which the can-bodies rest and by which they are firmly supported while being operated upon by the flanging-tools, of a conveyer for moving the can-bodies along the feed-table into registry with the flanging-tools, a pair of opening and closing flange limiting or controlling jaws which embrace the can-body near its upper end, center it accurately with the flanging-tools, and limit or control the extent to which the flange may be turned down or formed upon the can-body and insure absolute trueness and uniformity in the height of the flanges on the can-bodies, and a reciprocating rotating head furnished with flanging-tools. By the coöperative action of these parts or devices the flanges may be formed absolutely true and uniform all around the can-body in a true plane and all the can-bodies may be flanged uniformly and alike in respect to height, and the work may also be done very rapidly and cheaply.

My invention also consists in the novel devices and novel combinations of parts and devices herein shown and described, and specified in the claims.

Figure 2:
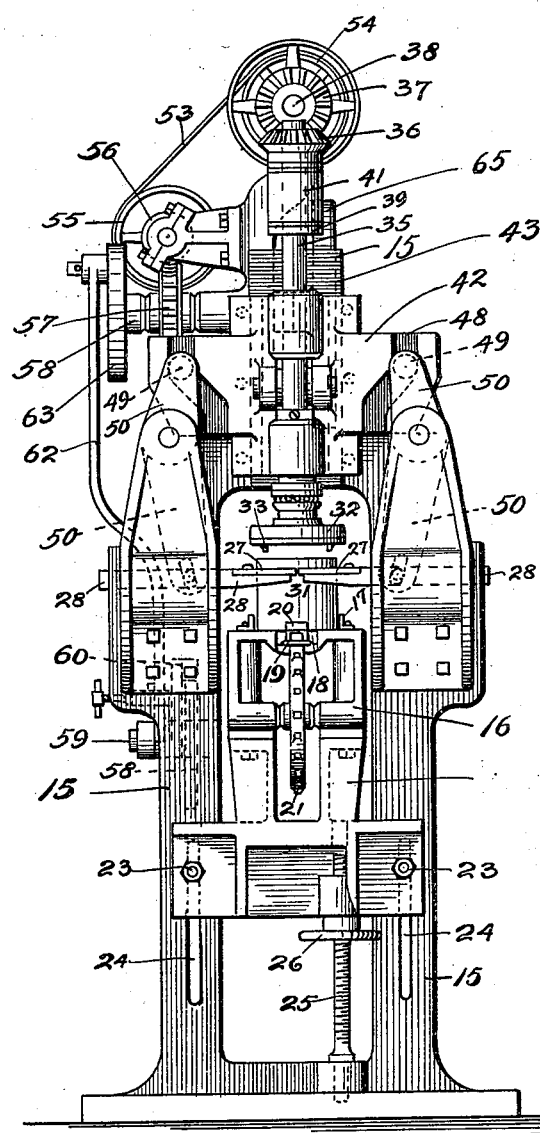
Figure 3:
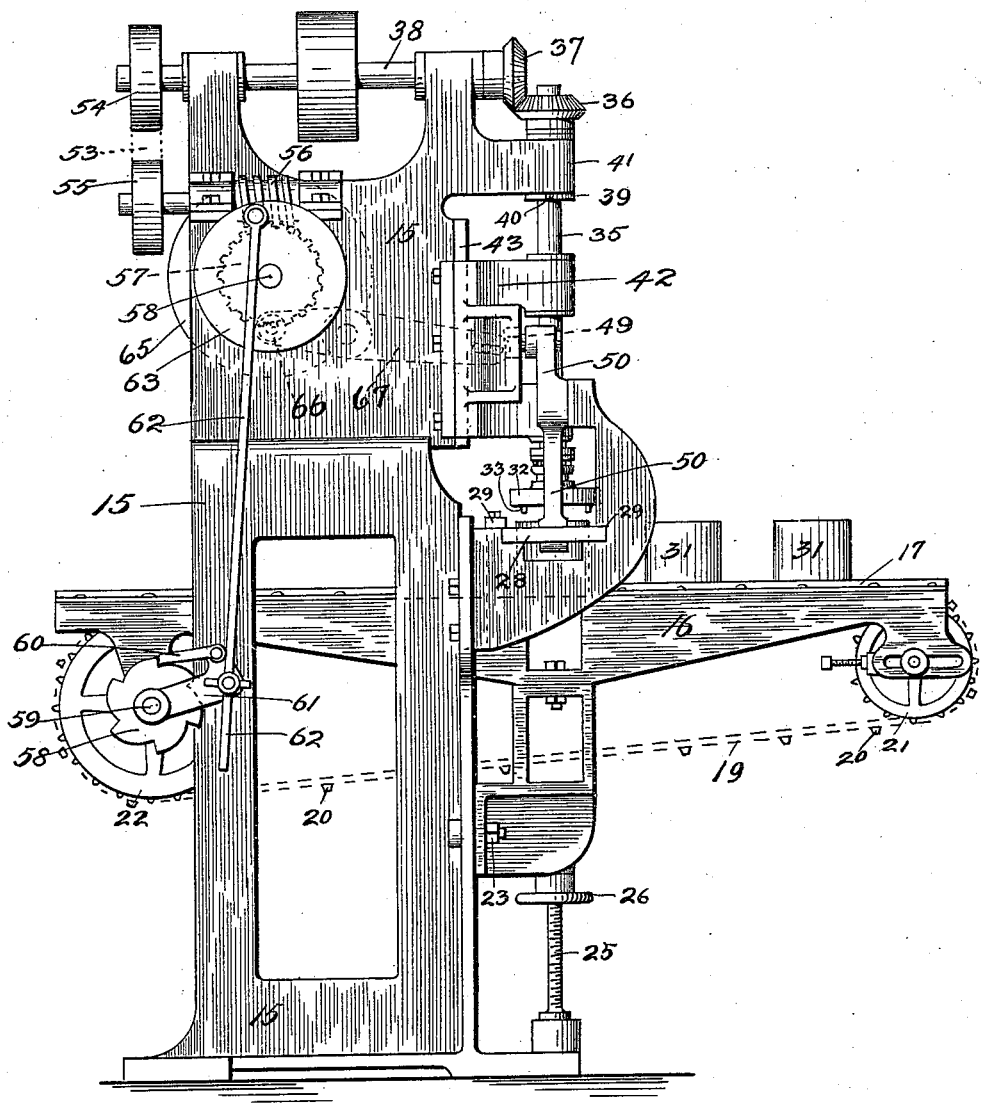
Figure 4:
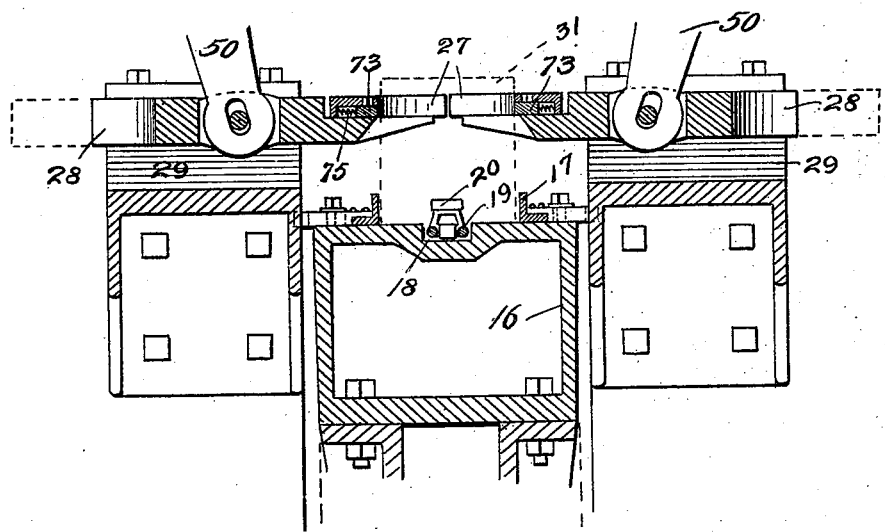
Figure 5:
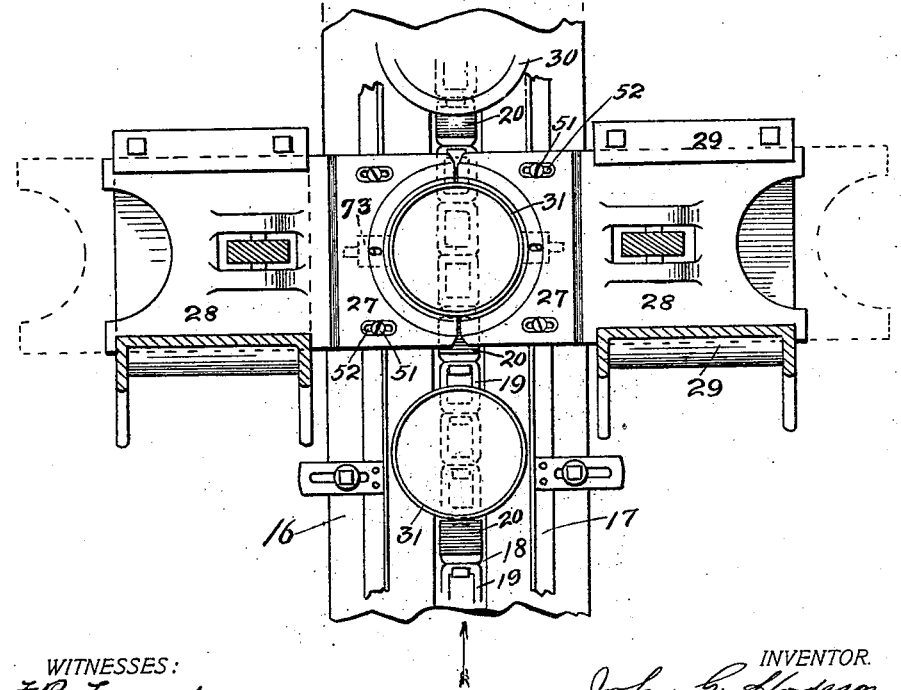

In the accompanying drawings, forming a part of this specification, Figure 1 is a side elevation of a machine embodying my invention; Fig. 2, a front elevation; Fig. 3, a side elevation looking from the opposite side to that shown in Fig. 1. Fig. 4 is a detail central vertical cross-section. Fig. 5 is a detail plan view of parts shown in Fig. 4. Fig. 6 is an enlarged detail front view of one of the can-body-clamping jaws. Fig. 7 is a detail perspective of a stripper device for freeing the can-body from the jaw. Fig. 8 is a vertical cross-section similar to Fig. 4, showing the preferred form of can-body stripper or ejector. Fig. 9 is a plan view of the parts shown in Fig. 8. Fig. 10 is a detail central vertical section showing the flanging head and tools and the rotating and sliding shaft therefor. Fig. 11 is a cross-section on line 11 11 of Fig. 10, and Figs. 12 and 13 show a can-body before and after being operated upon by the machine.

In the drawings, 15 represents the frame of the machine; 16, the feed-table, having longitudinal guides 17 for the can-bodies, laterally adjustable on the table to accommodate can-bodies of different diameters and provided with a groove or channel 18 for the conveyer, the same being preferably an endless chain 19, having fingers 20 at intervals for pushing the can-bodies along the feed-table. The chain or conveyer is operated by sprocket-wheels or pulleys 21 22, journaled upon the feed-table. To accommodate cans of different heights or sizes, the feed-table may be adjusted up and down by means of bolts 23, which pass through slots 24 in the frame. The adjusting-screw 25 and hand-nut 26 enable the height of the feed-table to be accurately adjusted in respect to the flanging head and tools and in respect to the clamping-jaws, and thus regulate the height and width of the flange, as may be required.

27 27 are a pair of opening and closing can-body-clamping jaws secured to the reciprocating slides 28, which work back and forth in suitable guides 29 on the frame of the machine, so as to open and receive the can-body between them as the same is moved along on the feed-table by the conveyer and then close upon the same to finally clamp and hold it and round and true it up and center it accurately with the flanging head and tools. These clamping-jaws also act as limits, stops, or forming-dies to regulate and control the shape and height of the flange 30, formed on the can-body 31, and to cause the same to be true and uniform not only in respect to the whole circumference of each can-body, but also in respect to all the can-bodies operated upon.

32 is the reciprocating and rotating flanging-head, provided with grooved flanging rollers or tools 33, journaled on suitables studs 34, which are secured to the head 32. The flanging-head 32 is provided with a cap 32½, covering the tools. The flanging-head 32 is operated by a sliding and rotating shaft 35, which is rotated by a gear 36, with which it has a splined connection to permit it to reciprocate through the gear. The gear 36 meshes with a bevel-gear 37 on the driving-shaft 38. A collar 39, secured to the gear 36 by a set-screw 40, holds the gear in place in the box or bearing 41. The shaft 35 is given its reciprocating or up-and-down movement, as required, by a vertically-reciprocating slide 42, mounted on suitable guides 43 on the frame of the machine and to which the shaft 35 is adjustably connected by means of the externally-threaded sleeve 44 and collars 45 46 47, antifriction-balls 48 being preferably inserted between the collars 46 and 47. By turning the adjusting-sleeve 44 the operation of the flanging-tools may be accurately regulated and adjusted as required.

The clamping-jaws 27 are operated or opened and closed, as required, by means of cams 48 on the slide 42, which engage antifriction-rollers 49 on the levers 50, which are connected to the slides 28, carrying the clamping-jaws 27. The clamping-jaws are removably and adjustably connected to their slides by set-screws 51, which pass through slots 52, so that the clamping-jaws may be properly adjusted for operation and so that they may be replaced by others of different sizes for operating upon cans of different diameters.

Motion is communicated to the cam 48 from the driving-shaft 38 through the belt 53 and pulleys 54 55 and worm 56 and gear 57 on the shaft 58 of the cam 65 and lever 67, having roller 66, lever 67 being connected to slide 42. The required intermittent motion is communicated to the can conveyer or feeder 19 by means of a ratchet 58 on the shaft 59 and a pawl 60, carried on the vibrating arm 61, which is actuated by a pitman 62, connected to a wheel 63 on the shaft 58.

The clamping-jaws are preferably provided with a flange-former edge, bead, or die 71 to form a rounded and slightly-raised shoulder 72 at the junction or corner of the flange 30 and can-body 31, as illustrated in Fig. 13.

To prevent the can-bodies from sticking to the clamping-jaws when the clamping-jaws are opened or withdrawn, I provide coöperating strippers or ejectors 73. These may be movably mounted in dovetail grooves 74 in the clamping-jaws and actuated by springs 75, but are preferably adjustably fixed to the frame of the machine by screw-bolts 76 passing through slots 77 in the strippers, as illustrated in Figs. 8 and 9.

I claim—

1. In a can-body-flanging machine, the combination with a support for the can-body, of a flanging head and tool and opening and closing can-body-clamping jaws embracing the can-body to center it with the flanging head and tool, and to control or limit, shape and true the flange formed on the can-body, means for automatically operating the flanging-head, and automatic mechanism for opening and closing the clamping-jaws, substantially as specified.

2. The combination with the feed-table for supporting the can-bodies, of a can-body conveyer or feeder, a pair of opening and closing can-body-clamping jaws, and a rotating and reciprocating flanging-head, furnished with flanging-tools, substantially as specified.

3. The combination with the feed-table, of a can-body conveyer or feeder, a pair of opening and closing can-body-clamping jaws, a rotary flanging head and tool, a slide for reciprocating said flanging-head provided with cams for operating the clamping-jaws, substantially as specified.

4. In a can-body-flanging machine, the combination with a support for the can-body, of a flanging head and tool and opening and closing can-body-clamping jaws embracing the can-body to center it with the flanging head and tool and to control or limit, shape and true the flange formed on the can-body, said can-body-clamping jaws having a raised and rounded bead or die 71 for forming a curved and slightly-raised shoulder at the corner or junction of the can-body and its flange, substantially as specified.

5. The combination with a can-body feed-table, of an endless flexible can-body conveyer, longitudinal guides for the can-bodies, a rotating and reciprocating flanging head and tool, and means for centering the can-body with the flanging-head, substantially as specified.

6. In a can-body-flanging machine, the combination with a can-body feed-table, of an intermittent can-body feeder or conveyer, a flanging head and tool, and means for automatically centering the can-body with the flanging-head, substantially as specified.

7. The combination with a can-body feed-table and conveyer, of clamping-jaws embracing the can-body near its top, and a flanging head and tool, substantially as specified.

8. The combination with a can-body feed-table and conveyer, of clamping-jaws embracing the can-body near its top, and a flanging head and tool, said feed-table having longitudinal guides for the can-bodies, substantially as specified.

9. The combination with a can-body feed-table and conveyer, of clamping-jaws embracing the can-body near its top, a flanging head and tool, and strippers or ejectors for freeing the can-bodies from the clamping-jaws, substantially as specified.

10. The combination with a can-body-flanging head and tool of a feed-table having a central channel, an endless, flexible can-body feeder-chain working in said channel below the surface of the table, substantially as specified.

11. The combination with a vertically-adjustable can-body feed-table having laterally-adjustable can-body guides, of a rotating and reciprocating flanging head and tool, substantially as specified.

12. The combination with a vertically-adjustable can-body feed-table having laterally-adjustable can-body guides, of a flanging-head and means for centering the can-body with the flanging-head, substantially as specified.

13. The combination with a rotating and reciprocating flanging-head, of can-body-clamping jaws, a slide for the reciprocating flanging-head, provided with cams for operating the clamping-jaws, substantially as specified.

14. The combination with a rotating and reciprocating flanging-head, of can-body-clamping jaws, a slide for reciprocating the flanging-head, provided with cams for operating the clamping-jaws, and an adjustable threaded sleeve connection between the flanging-head shaft and said slide, substantially as specified.

JOHN G. HODGSON.

Witnesses:
H. M. MUNDAY,
EDMUND ADCOCK.